US 7,669,864 B2

(12) United States Patent
Rawlinson (10) Patent No.: US 7,669,864 B2
(45) Date of Patent: Mar. 2, 2010

(54) LATERALLY-LEANING FOUR WHEELED VEHICLE

(76) Inventor: Rodney Ian Rawlinson, 71 Bryanston Crescent, Cnr Hobart & Bantry Roads, Bryanston, 2196 Sandton (ZA)

( * ) Notice: Subject to any disclaimer, the term of this patent is extended or adjusted under 35 U.S.C. 154(b) by 634 days.

(21) Appl. No.: 10/576,605

(22) PCT Filed: Oct. 21, 2004

(86) PCT No.: PCT/IB2004/003436

§ 371 (c)(1),
(2), (4) Date: Mar. 21, 2007

(87) PCT Pub. No.: WO2005/037637

PCT Pub. Date: Apr. 28, 2005

(65) Prior Publication Data

US 2007/0262548 A1     Nov. 15, 2007

(30) Foreign Application Priority Data

Oct. 21, 2003   (ZA) .................................... 03/8179

(51) Int. Cl.
*B60H 21/00*     (2006.01)
(52) U.S. Cl. .................. 280/124.103; 180/21; 180/311; 180/312
(58) Field of Classification Search .................. 280/124, 280/103, 781, 6.15, 6.154; 180/21, 311, 180/312
See application file for complete search history.

(56) References Cited

U.S. PATENT DOCUMENTS 3,572,456 A  *  3/1971  Healy ........................... 180/217
4,423,795 A  *  1/1984  Winchell et al. ............. 180/215

2002/0190494 A1    12/2002  Cocco et al.

FOREIGN PATENT DOCUMENTS

| DE | 3711554 | * 10/1988 | .......... 280/124.103 |
|---|---|---|---|
| EP | 0 626 307 A1 | 11/1994 | |
| EP | 1 155 950 A2 | 11/2001 | |
| FR | 2 522 590 | 9/1983 | |

(Continued)

OTHER PUBLICATIONS

International Search Report, dated Apr. 24, 2006, in PCT application No. IB2004/003436.

*Primary Examiner*—Eric Culbreth
(74) *Attorney, Agent, or Firm*—Finnegan, Henderson, Farabow, Garrett & Dunner, L.L.P.

(57) ABSTRACT

This invention relates to wheeled vehicles and particularly to motorised road vehicles. The wheeled vehicle (10) includes two frames (12) for carrying road wheals (18, 20), the frames (12) being laterally spaced apart. A pair of road wheels (18, 20) are mounted on each frame (12) for supporting that frame (12) on the ground, the wheels (18, 20) of each pair being mounted for rotation about operatively more or less horizontal rotational axes which are spaced apart along the associated frame (12). A motor (36) is connected by a drive train (48, 28, 30, 32) to a rear wheel (20) on each of the wheeled frames (12). The wheeled frames (12) are connected together for synchronous tilting relative to the vertical, so that the camber angles of all the wheels (18, 20) change in response to lateral tilting of the frames (12).

13 Claims, 7 Drawing Sheets

| | FOREIGN PATENT DOCUMENTS | | | |
|---|---|---|---|---|
| FR | 2646379 | * 11/1990 | .......... | 280/124.103 |
| GB | 2 279 047 A | 12/1994 | | |
| JP | 3-82689 | * 4/1991 | .......... | 280/124.103 |
| JP | 5-16816 | * 1/1993 | .......... | 280/124.103 |
| WO | WO 97/27071 | 7/1997 | | |
| WO | WO 03/057549 A1 | 7/2003 | | |

* cited by examiner

LATERALLY-LEANING FOUR WHEELED VEHICLE

THIS INVENTION relates to wheeled vehicles. In particular, the invention relates to a motorized road vehicle.

The invention provides a wheeled vehicle which includes:
- two frames for carrying road wheels, the frames being laterally spaced apart;
- a pair of road wheels mounted on each frame for supporting that frame on the ground, the wheels of each pair being mounted for rotation about operatively more or less horizontal axes of rotation, and being spaced apart along the associated frame; and
- a motor or drive means which is connected by a drive train to at least one wheel on each of the wheeled frames, the wheeled frames being connected together for synchronous lateral or sideways tilting relative to the vertical, so that the camber angle of each wheel changes in response to tilting of the frames.

Typically, each frame has mounted thereon a front wheel and a rear wheel, the front wheels being operatively connected to a driver operable steering mechanism for synchronous pivotal displacement about respective steering axes.

In addition, the motor may be connected by the drive train to the rear wheels for driving thereof. The motor is typically an engine, such as an internal combustion engine.

The vehicle typically includes a seat frame positioned between the wheeled frames, the seat frame being connected to the wheeled frames such that the seat frame is clear of the ground and is configured for synchronous tilting with the wheeled frames. In a preferred embodiment of the invention, the seat frame provides a motorcycle-type saddle for a driver of the vehicle. It will be appreciated that the pair of wheeled frames and the seat frame will be more or less parallel in that the fore-and-aft direction.

The fore-and-aft directions of each of the wheeled frames and of the seat frame may be more or less aligned with the fore-and-aft direction of the vehicle. The vehicle thus has a configuration similar to a catamaran boat, having a pair of laterally spaced frames for supporting the vehicle on the ground, the central frame being suspended clear of the ground by the wheeled frames.

The steering mechanism is preferably provided on the seat frame, the steering mechanism typically being in the form of a motorcycle-type handle bar. In a particular embodiment of the invention, the front wheels of the respective wheeled frames are connected by a steering linkage to the handle bar.

Function controls for the vehicle may conveniently be provided on the handle bar, the controls typically including a twist grip throttle for the motor and a brake lever for operating brakes on the wheels. These controls may conveniently function in a manner similar to that of conventional motorcycle controls.

A driven cog may be rotatably mounted on each wheeled frame, each driven cog being drivingly connected to the motor and being connected, in turn, to the associated rear wheel by a chain- or belt drive. The drive train may, instead, include a driven shaft which connects each half-shaft to the associated rear wheel.

In one embodiment of the invention, the engine is carried by the seat frame, the motor being drivingly connected to the respective driven cogs by a pair of half shafts, each half shaft typically having a pair of universal joints at its ends, whereby the half shaft is connected to the motor and to the driven cog respectively.

Preferably, the vehicle includes a differential connected in-line in the drive train between the motor and the half shafts, so that the relative speeds of rotation of the driven rear wheels, through the half shafts, are automatically variable during cornering.

In one embodiment of the invention, the wheeled frames and the seat frame are connected together by a plurality of laterally extending link members, each lateral link member being connected to both wheeled frames and to the seat frame, each connection being such as to permit pivotal displacement of the link member relative to the respective frame about a pivot axis which is aligned with the fore-and-aft direction of the vehicle. In other words, each lateral link member is connected at three spaced connections respectively to the wheeled frames and to the seat frame, the link member being pivotally displaceable relative to the respective frames at each connection about parallel respective pivot axes which are aligned with the fore-and-aft direction of the vehicle.

The link members may be rigid, so that they remain constant in length irrespective of operative tilting of the frames. Preferably, the link members are equal in length and the connection of each link member to the seat frame is positioned midway between the connections of that link member to the respective wheeled frames. Such an arrangement automatically results in synchronous and equal tilting relative to the vertical of the wheeled frames and the seat frame.

Typically, the link members comprise two link bars which are located at a relatively high level and which are spaced apart in the fore-and-aft direction of the vehicle. In addition, one of the link members may comprise a platform member which is located at a relatively low level and provides a support surface for the feet of a driver seated on the seat frame.

Each of the wheeled frames may be in the form of a motorcycle frame, the front wheel of each frame being mounted on a fork, preferably a hydraulic fork, which is pivotally displaceable about its longitudinal axis, so that the steering axis of each front wheel is provided by the longitudinal axis of the associated fork, suspension for the front wheel being incorporated in hydraulically damped telescopic struts of the fork, the struts straddling the wheel so that free ends of the struts house an axle of the wheel.

The rear wheel of each wheeled frame may be mounted on a free end of a pivot arm which extends in the fore-and-aft direction of the vehicle and which is pivotally connected at its frontmost end to the associated wheeled frame for pivoting about an operatively more or less horizontal pivot axis, pivotal movement of the pivot arm being sprung and damped.

Differently defined, the invention provides a vehicle which includes:
- two wheeled frames which are operatively upright, each frame having a pair of road wheels which are rotatably mounted on the frame one behind the other, so that each frame has a front wheel and a back wheel, the wheeled frames being laterally spaced apart;
- a seat frame which is located between the wheeled frames; and
- a connection arrangement which connects the wheeled frames and the seat frame together such that the wheeled frames are synchronously tiltable relative to the vertical to vary the orientation relative to the vertical of axes of rotation of the wheels of each wheeled frame.

The invention will now be further described by way of example, with reference to the accompanying diagrammatic drawings, in which.

In the drawings, reference numeral 10 generally indicates a vehicle in accordance with the invention. The vehicle 10 is a quad-type vehicle which has characteristics of both a motorcycle and of a four wheel automobile. In this example, the vehicle 10 is a dual-purpose vehicle in that it is intended both for on-road and off-road use.

The vehicle 10 includes two motorcycle-type frames 12 which are laterally spaced apart and which are connected together by a connection arrangement. A seat frame 14 which provides a motorcycle saddle 16 for a driver (not shown) of the vehicle 10 is located between the two motorcycle-type frames 12, being connected to both lateral frames 12 by the connection arrangement.

Each motorcycle-type frame 12 is more or less upright and has mounted thereon two road wheels 18, 20. The wheels 18, 20 are positioned one behind the other, being aligned in the fore-and-aft direction of the vehicle 10, so that each wheeled frame 12 has a front wheel 18 and a rear wheel 20. In typical motorcycle-fashion, the wheels 18, 20 are mounted for rotation about operatively more or less horizontal rotational axes which are normal to the fore-and-aft direction of the vehicle 10.

The front wheel 18 of each frame 12 is mounted on a elongate hydraulic fork 22 which is pivotally displaceable about its longitudinal axis to effect steering of the associated front wheel 18. Thus, each fork 22 has a pair of parallel telescopic struts which straddle the associated front wheel 18, an axle of the associated front wheel 18 being received in the free ends of the struts of each fork 22. In conventional fashion, each of the struts incorporates a hydraulic damping arrangement which provides a suspension system for suspending the frame 12 on the front wheel 18.

Figure 1:
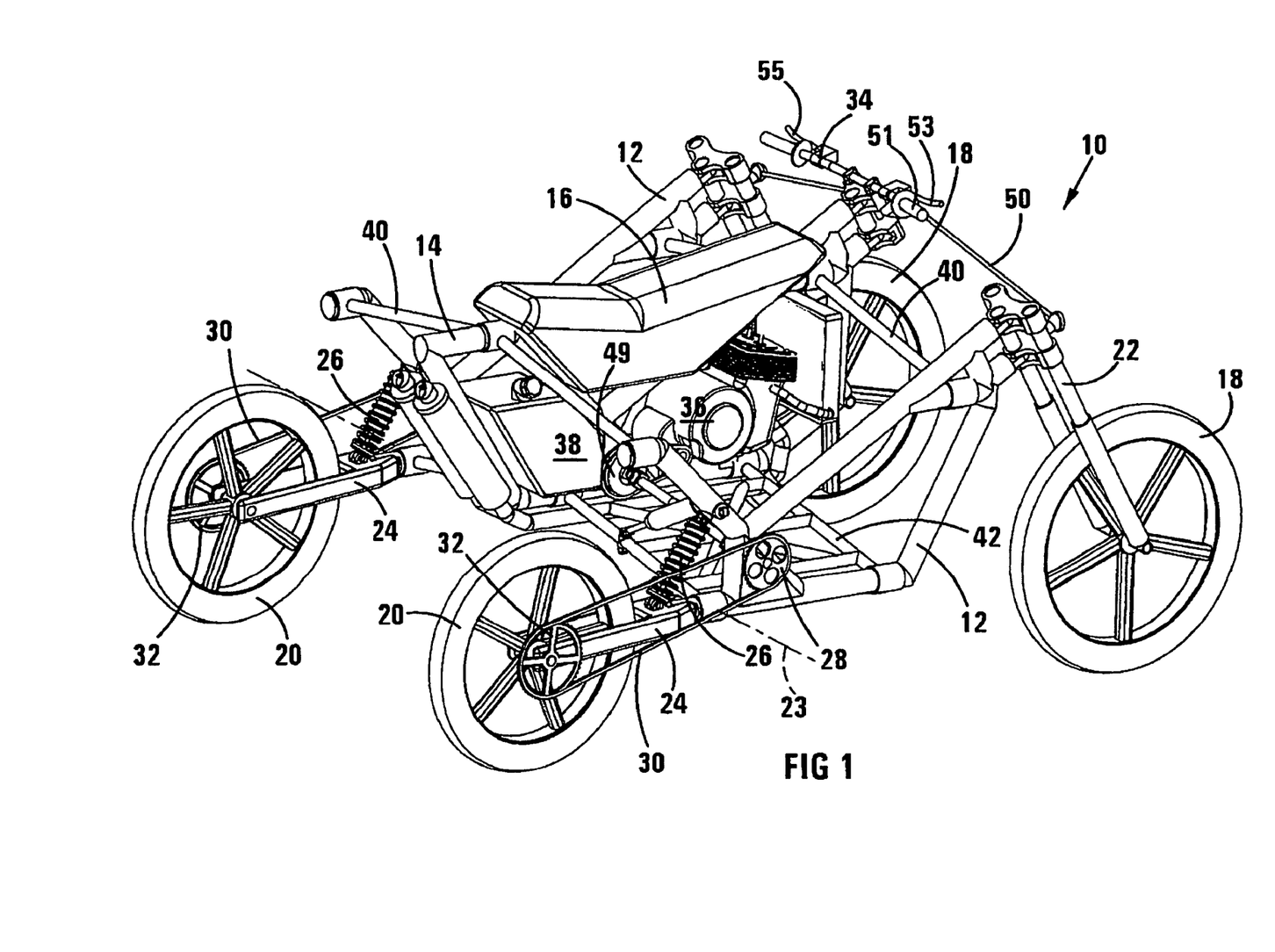
FIG. 1 is a schematic three-dimensional view of a vehicle in accordance with the invention, the vehicle being in a fully upright position.

Each rear wheel 20 is rotatably mounted on a free end of a pivot arm 24 which is pivotally displaceable about a pivot axis 23 (shown in FIG. 1) which is more or less parallel to the rotational axis of the associated rear wheel 20. The pivot arm is thus operatively pivotally displaceable in a plane defined by the associated wheeled frame 12, to displace the rear wheel 20 up-or-downwardly towards or away from the frame 12. Each pivot arm 24 is further connected to the associated frame 12 by a strut 26 which incorporates a spring-and-damper suspension arrangement in conventional fashion.

A driven chain wheel or cog 28 is mounted more or less centrally at a low level on each of the wheeled frames 12, each cog 28 being drivingly connected by a drive chain 30 to a toothed cog 32 on the associated rear wheel 20. Each endless drive chain 30 thus passes over the rear cog 32 and over the driven cog 28 of the associated frame 12.

As can be seen in the drawings, the wheeled frames 12 are located in planes which are more or less parallel and which are located side-by-side, the seat frame 14 defining a plane which is positioned between the wheeled frames 12 and which is more or less parallel to the planes defined by the wheeled frames 12.

The seat frame 14 can be described as a motorcycle frame without wheels, the seat frame 14 providing a motorcycle-type saddle 16 for a driver of the vehicle 10 and a pivotable handle bar 34 at the front of the seat frame 14. An internal combustion engine 36, in this example a four-stroke petrol engine, is mounted on the seat frame 14, as is a petrol tank 38 for providing fuel to the engine 36.

The frames 12, 14 are connected together by number of transverse link members 40, 42. In this example, the link members comprise a pair of link bars 40 and a laterally extending platform 42. The link bars 40 are located at a relatively high level and are spaced apart in the fore-and-aft direction, while the platform 42 extends between the wheeled frames 12 at a low level. Each of these link members 40, 42 extends between the wheeled frames 12, being connected to both of the wheeled frames 12 as well as to the seat frame 14. Each such connection permits relative pivotal displacement about an associated horizontal pivot axis which is aligned with the fore-and-aft direction of the vehicle 10, so that the pivot axes of the respective connections are parallel to each other. In this example, each connection between one of the link members 40, 42 and one of the frames 12, 14 is provided by a bush forming part of the link members 40, 42, the bush housing a bar or a pipe forming part of the relevant frame 12, 14, the bar or the pipe having a circular cross-sectional profile and the bar or pipe extending in the fore-and-aft direction of the vehicle 10.

Figure 3:
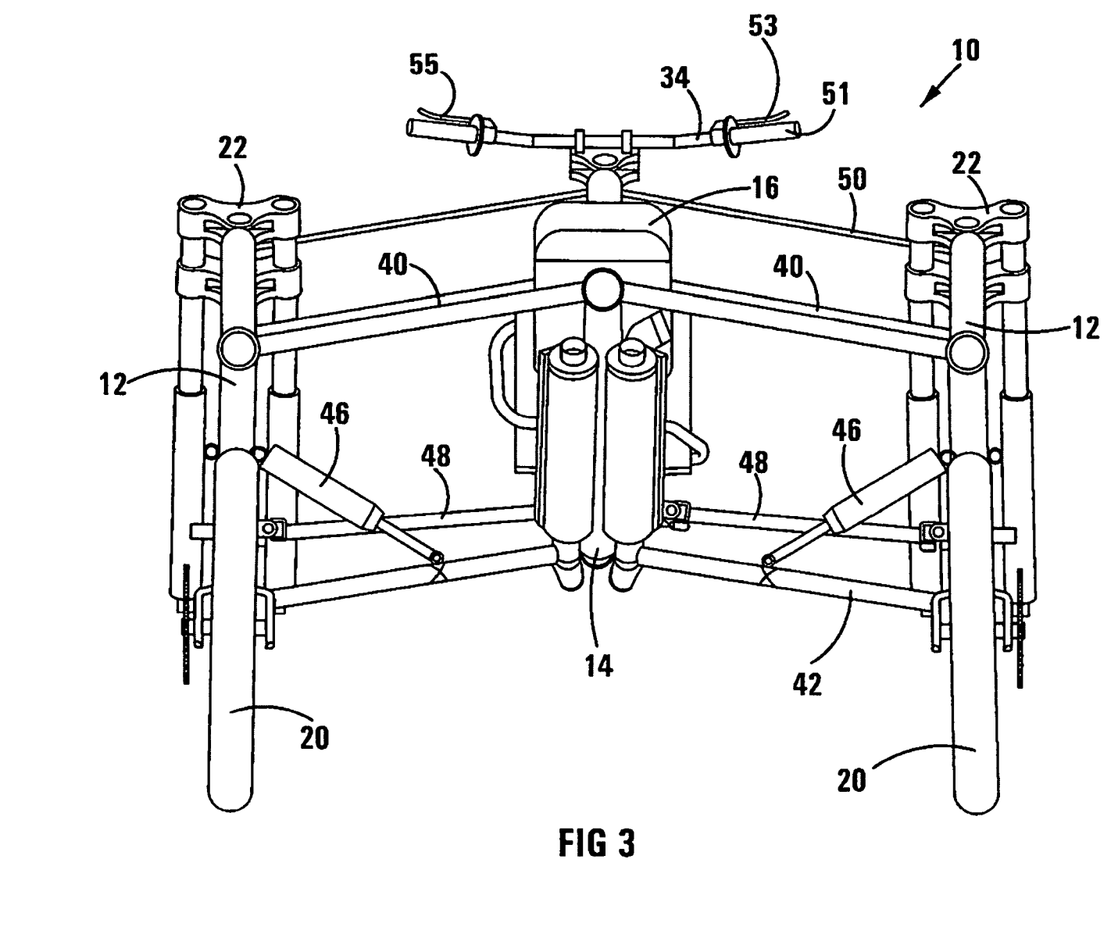
FIG. 3 is a schematic rear elevation of the vehicle of FIG. 1, the vehicle being in a fully upright position.
Figure 4:
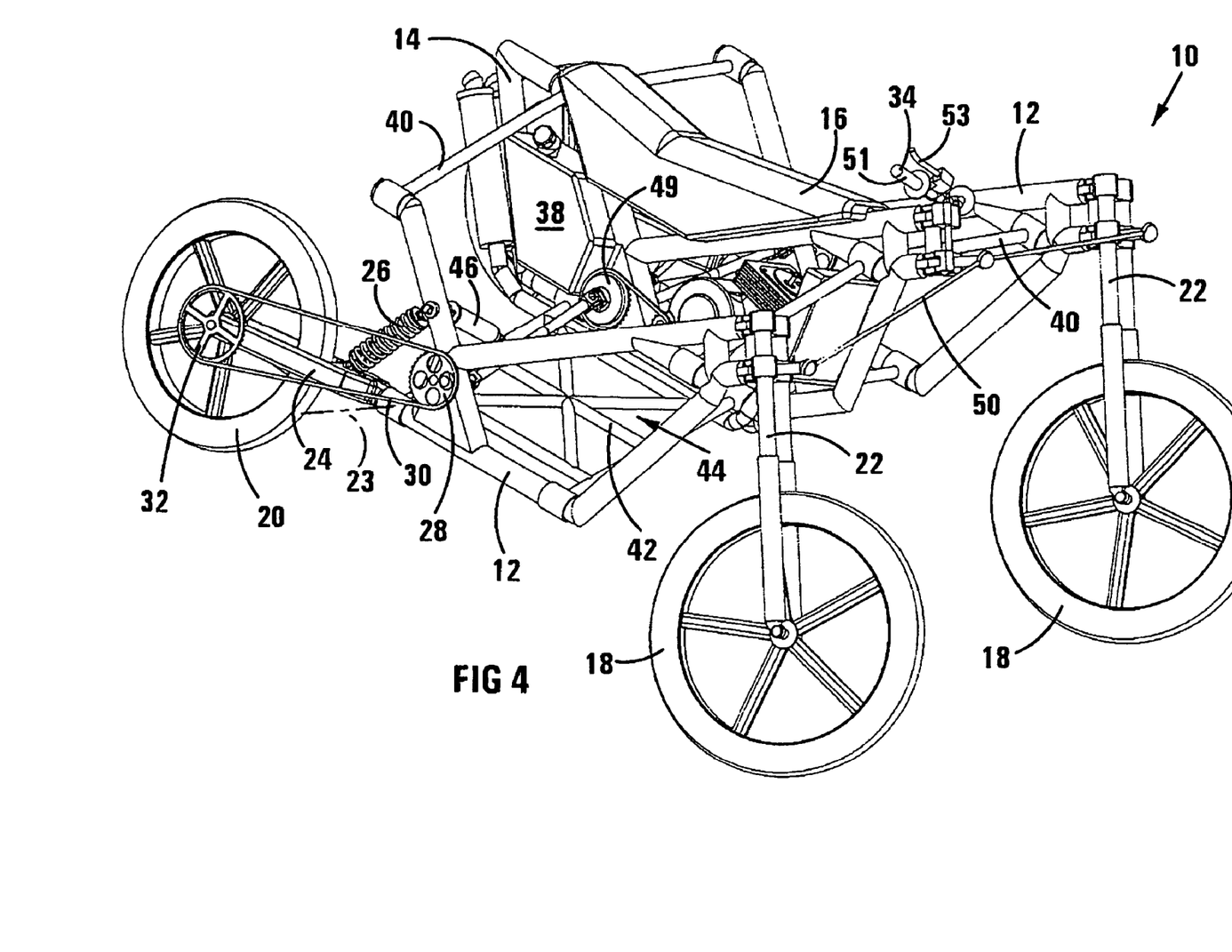
FIG. 4 is a view corresponding to FIG. 1, the vehicle being in a tilted position.
Figure 5:
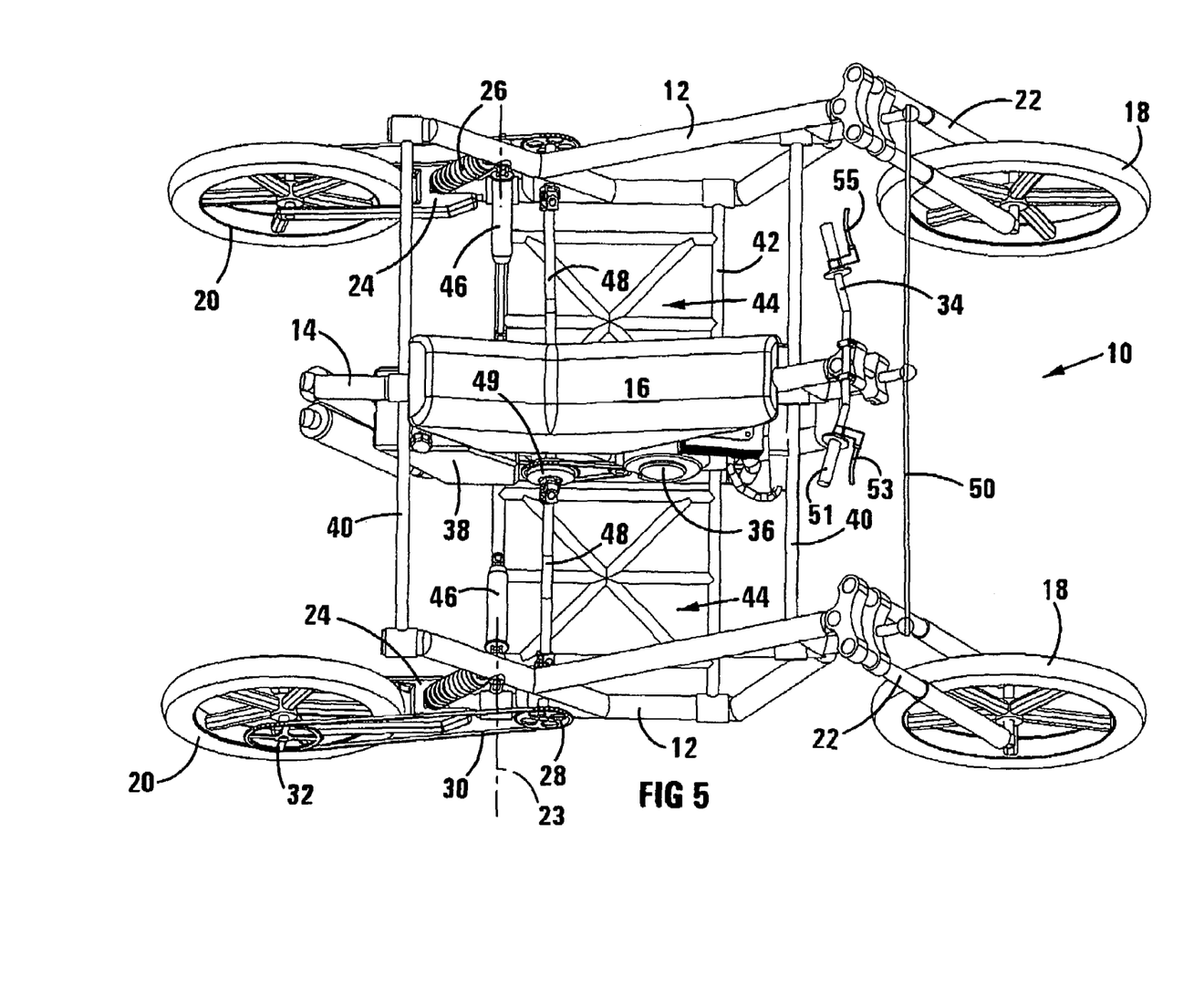
FIG. 5 is a view corresponding to FIG. 2, showing the vehicle in its tilted position.

The link bars 40 and the platform 42 are each slightly cranked to have a flattened inverted V-shape in rear elevation (FIG. 3), so that the seat frame 14 is somewhat raised relative to the wheeled frames 12. It should be appreciated that although the link bars 40 and platform 42 are cranked, they are rigid and have a constant length in operation, there being no pivoting between sections of each link bar 40. However, in other examples of the invention, each link bar 40 can comprise two legs which are hinged together at the connection of the link bar to the seat frame 14, so that an angle between the legs of the link bar can optionally be varied caliper-fashion, to vary the transverse spacing between the wheeled frames 12, and thus to vary the width of vehicle 10 and the height of the seat frame 14. Once a desirable width has been selected, the legs of each link bar can then be locked together, to prevent relative pivoting during use.

The platform 42 is located at a low level and defines a pair of more or less flat support surfaces 44 on either side of the seat frame 14, to support the feet a driver seated on the saddle 16.

Figure 2:
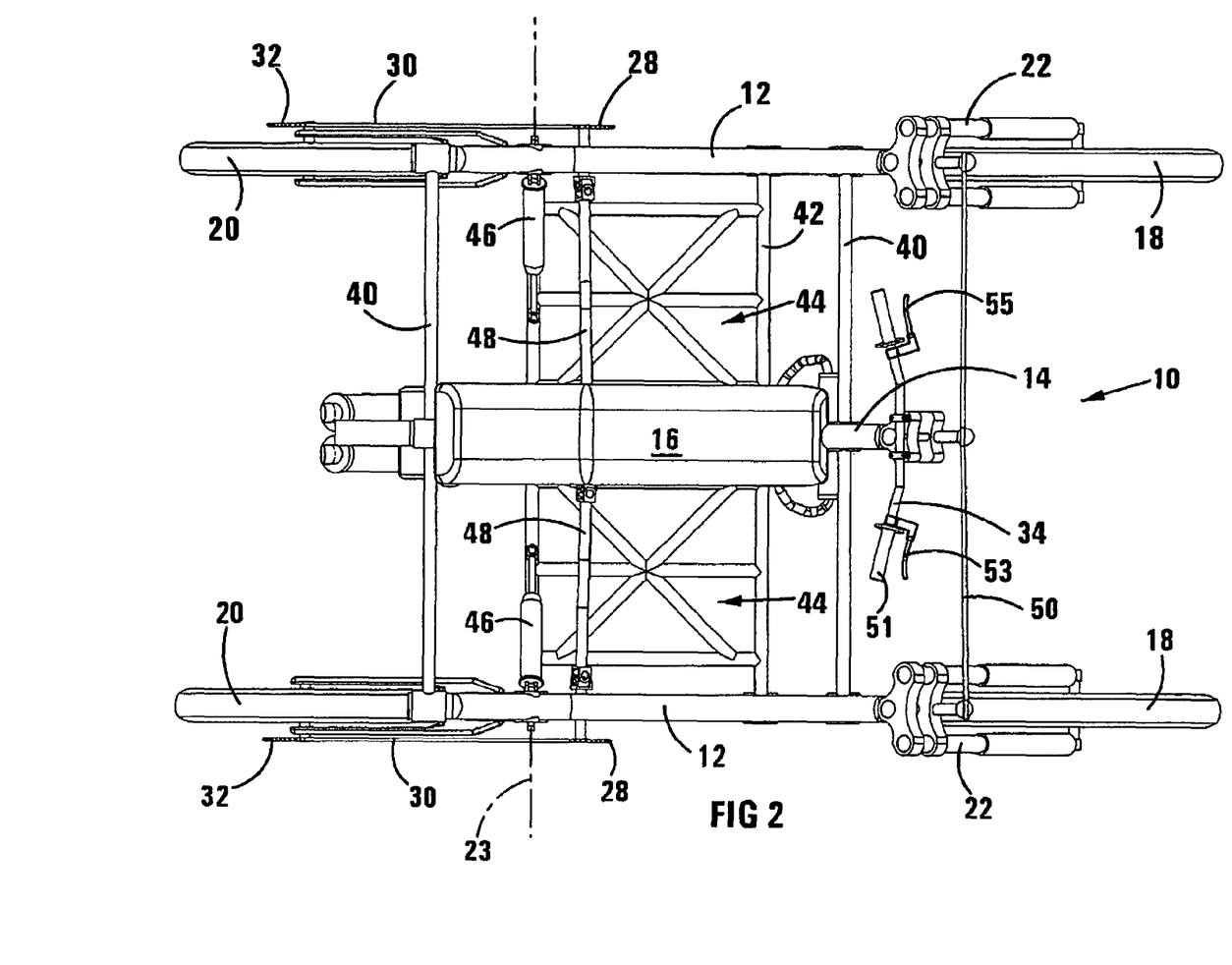
FIG. 2 is a schematic plan view of the vehicle of FIG. 1, the vehicle being in a fully upright position.

The vehicle 10 includes a pair of oblique telescopic struts 46 (FIGS. 2 and 3), each of which is connected to one of the wheeled frames 12 and to the platform 42 adjacent that wheeled frame 12. These struts 46 serve to limit pivotal displacement of the wheeled frames 12 relative to the platform 42, thus acting as stops to limit operative tilting of the frames 12, 14 relative to the vertical. Each strut 46 is furthermore provided with spring-and-damper arrangement, so that the struts 46 assist operative return to the neutral position shown in FIGS. 1 to 3 after intentional tilting of the frames 12, 14 by a driver of the vehicle 10.

The driven cogs 28 of the respective wheeled frames 12 are drivingly connected to the engine 36 by respective half-shafts 48 (FIGS. 2 and 3) which extend transversely between the respective wheeled frames 12 and the seat frame 14. Each half shaft 48 has a universal joint at both its ends, so that torque and rotation can be transmitted by the half shafts 48 to the driven cogs 28 irrespective of operative tilting of the vehicle 10. A gearbox and differential 49 are connected in line between the half shafts 48 and the engine 36. Each rear wheel 20 is thus operatively driven and is drivingly connected to the engine 36 by a drive train comprising the gearbox and differential 49 the associated half shaft 48, the driven cog 28, the drive chain 30, and the rear cog 32.

As can be seen in the drawings, the handle bar 34 is connected to the steering forks 22 of the respective wheeled frames 12 by a steering linkage 50, for synchronous pivotal displacement of the front wheels 18 about their respective steering axes in response to turning of the handle bar 34 by the driver. Function controls are provided on the handle bar 34 in a fashion similar to that of conventional motorcycles. Thus, one of handles provided by the handle bar 34 incorporates a twist grip throttle 51 (FIG. 2) for controlling the output of the engine 36. The handle bar 34 also provides a brake lever 53 (schematically shown) for operating brakes on the front wheels 18, and provides a clutch lever 55 (schematically shown). A rear brake operating member is provided by a brake pedal (not shown) on the seat frame 14.

In use, a driver of the vehicle 10 sits on the saddle 16 provided by the seat frame 14, the feet of the driver resting on the platform 42. When the gearbox is engaged, driving torque is transmitted through the half shafts 48 and the drive chains 30 to the rear wheels 20, to drive the vehicle 10. Once the vehicle 10 is moving at speed in a straight line, the wheeled frames 12 are kept upright by the same gyroscopic mechanics governing a motorcycle or a bicycle moving at speed. In this condition, the vehicle 10 thus functions similarly to rear-wheel driven quad motorcycle.

However, during cornering, the driver leans into the corner, shifting his bodyweight such that the seat frame 14 is tilted laterally from the vertical towards the inside of the corner. Such tilting of the seat frame 14, through operation of the link bars 40 and the platform 42, automatically results in synchronous tilting of the wheeled frames 12 into the corner, thus changing the camber angle of the road wheels 18, 20. The centre of gravity of the vehicle 10 is shifted towards the inside of the corner, facilitating effective cornering of the vehicle 10. It will be apparent that steering of the vehicle 10 thus occurs in a fashion similar to the steering of a motorcycle. However, the angle at which the frames 12, 14 can be tilted is limited by the limit struts 46.

Figure 6:
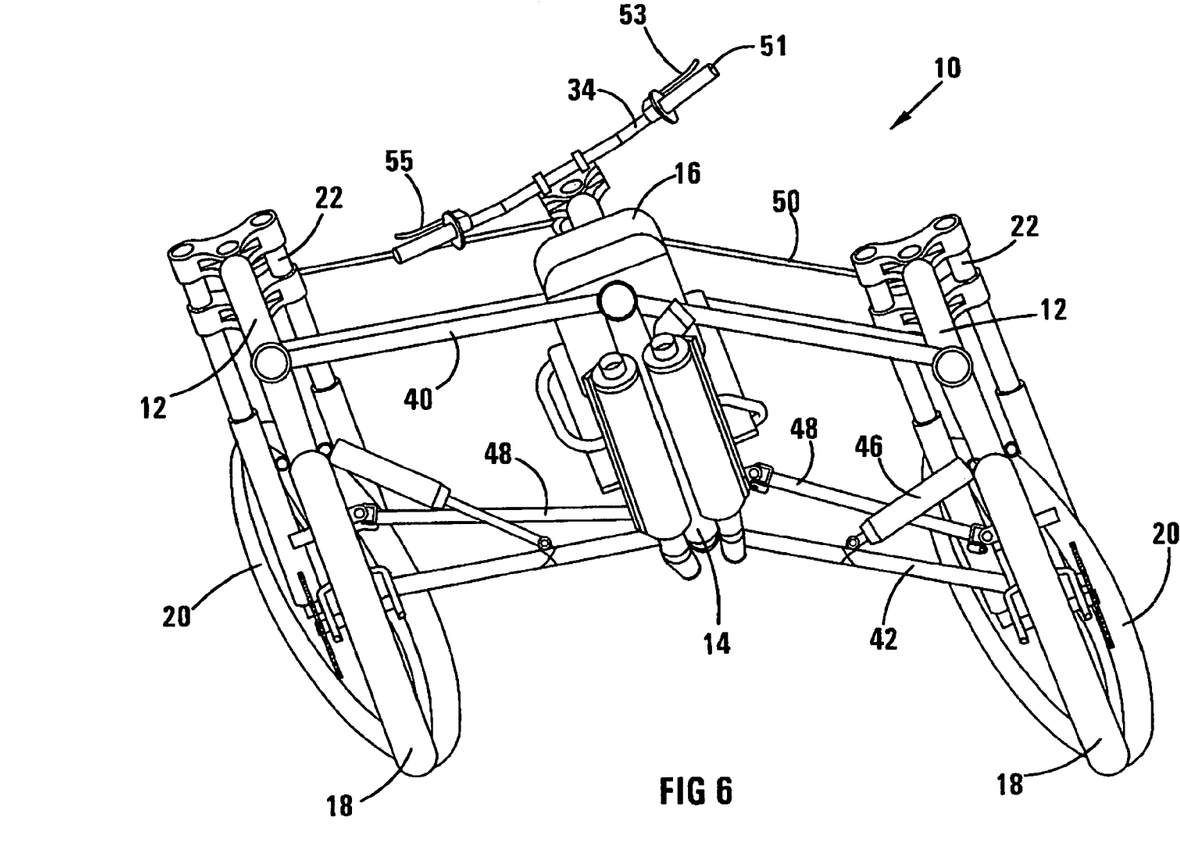
FIG. 6 is a view corresponding to FIG. 3, showing the vehicle in its tilted position.

As can best be seen in FIG. 6 of the drawings, the link members 40, 42 roughly maintain their horizontal orientation during such cornering. In this example (see FIG. 3) the link bars 40 and the platform 42 are equal in length, so that the angle of the respective wheeled frames 12 and the seat frame 14 to the vertical changes by equal amounts during cornering. Tilting of the wheeled frames 12 is thus synchronous and equal. However, in other embodiments of the invention the relative lengths of the link bars 40 and the platform 42 can be arranged such that the wheeled frame 12 which is on the inside of a corner during cornering, in other words the wheeled frame 12 towards which tilting occurs, tilts further from the vertical than the outside wheeled frame 12. This facilitates effective cornering, as the inner frame 12 in effect has to round a tighter corner than the outer wheeled frame 12.

After a corner has been exited, the driver, by the shifting of his bodyweight and with the aid of gyroscopic forces generated by the wheels 18, 20, again brings the seat frame 14, and thus automatically the wheeled frames 12, fully upright. Such forced displacement of the wheeled frames 12 is aided by the oblique struts 46, which incorporate coiled springs.

During cornering at speed, limited steering of the front wheels 18 is required, but at lower speeds, the vehicle 10 is steered by turning the handle bar 34. It will be appreciated that the steering linkage 50 will be arranged in a manner similar to that of the steering linkages of conventional automobiles, so that the respective front wheels 18 turn about different respective radii during low-speed cornering. Furthermore, operation of the differential automatically governs the relative speed of rotation of the rear wheels 20, in conventional fashion.

Figure 7:
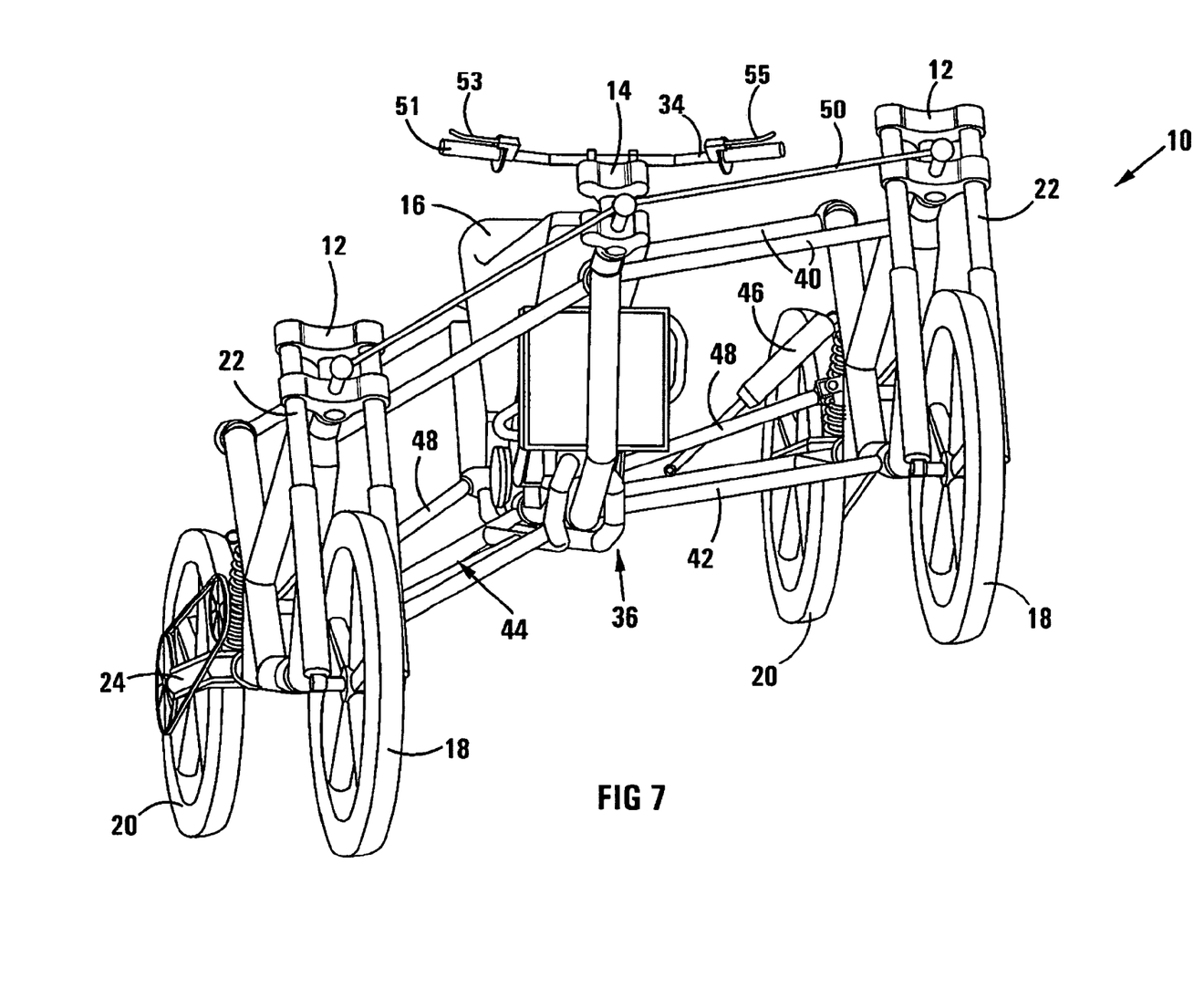
FIG. 7 is a schematic three-dimensional view of the vehicle of FIG. 1, showing the configuration of the vehicle when driven over uneven terrain.

The wheels 18, 20 of the vehicle 10 have independent suspension systems and the vehicle 10 is thus suitable for off-road use. Apart from the suspension system and the considerable ground-clear height of the seat frame 14, it is an advantage of the vehicle 10 in off-road applications that safe driving along a slope is facilitated. This can best be seen with reference to FIG. 7 of the drawings, in which the vehicle 10 is shown as if driving along a laterally extending slope of about 20°. Despite this angle, the seat frame 14 and the wheeled frames 12 are upright, having been tilted relative to the sloping support surface to remain vertical. This configuration naturally reduces the possibility of the vehicle 10 tipping over sideways while driving along the slope.

When parked, the wheeled frames 12 and the seat frame 14 are fully tilted sideways to the maximum extent, until stopped by one of the oblique struts 46. Alternatively, by temporarily locking the struts 46 in an upright position, easy maneuverability at low speeds is facilitated.

It is an advantage of the vehicle 10 as described with reference to the drawings that it provides the convenience of handling and high-speed cornering ability of a conventional motorcycle with the stability and comfort of so-called quad bikes. The limitations of quad bikes during cornering are overcome by leaning of the wheeled frames 12 into the corner. Furthermore, independent up-and-down movement of the frames 12 provides advantages during off-road use, particularly when driving along a slope which extends sideways.

The invention claimed is:

1. A wheeled vehicle which includes:
   two frames for carrying road wheels, the frames being laterally spaced apart;
   a pair of road wheels, including a front road wheel and a rear road wheel, mounted on each frame for supporting that frame on the ground, the wheels of each pair being mounted for rotation about operatively more or less horizontal axes or rotation, and being spaced apart along the associated frame; and
   a motor which is connected by a drive train to at least one wheel on each of the wheeled frames,
   the wheeled frames being connected together for synchronous lateral tilting relative to the vertical, so that the camber angle of each wheel changes in response to tilting of the frames, the front wheels being operatively connected to a driver operable steering mechanism for synchronous pivotal displacement about respective steering axes; and
   a seat frame positioned between the wheeled frames, the seat frame being connected to the wheeled frames such that the seat frame is clear of the around and is configured for synchronous tilting with the wheeled frames, the seat frame providing a seat for a driver of the vehicle, wherein the wheeled frames and the seat frame are connected together by a plurality of laterally extending link members, each lateral link member being connected to both wheeled frames and to the seat frame, each connection being such as to permit pivotal displacement of the link member relative to the respective frame about a pivot axis which is aligned with the fore-and-aft direction of the vehicle, and the link members comprise two link bars which are located at a relatively high level and which are spaced apart in the fore-and-aft direction of the vehicle, and a platform member which is located at a relatively low level and provides a support surface for the feet of a driver seated on the seat frame.

2. A vehicle as claimed in claim 1, in which the motor is connected by the drive train to the rear wheels for driving thereof.

3. A vehicle as claimed in claim 1, in which the fore-and-aft directions of each of the wheeled frames and of the seat frame are more or less aligned with the fore-and-aft direction of the vehicle.

4. A vehicle as claimed in claim 1, in which the steering mechanism is provided on the seat frame, the steering mechanism being in the form of a handle bar and the front wheels of the respective wheeled frames being connected by a steering linkage to the handle bar.

5. A vehicle as claimed in claim 4, in which function controls for the vehicle are provided on the handle bar.

6. A vehicle as claimed in claim 5, in which the function controls include a twist grip throttle for the motor and a brake lever for operating brakes on the wheels.

7. A vehicle as claimed in claim 1, in which a driven cog is rotatably mounted on each wheeled frame, each driven cog being drivingly connected to the motor and being connected, in turn, to the associated rear wheel by a chain or belt drive.

8. A vehicle as claimed in claim 7, in which the motor is carried by the seat frame, the motor being drivingly connected to the respective driven cogs by a pair of half shafts.

9. A vehicle as claimed in claim 8, in which the vehicle includes a differential connected in-line in the drive train between the motor and the half shafts, so that the relative speeds of rotation of the driven rear wheels, through the half shafts, are automatically variable during cornering.

10. A vehicle as claimed in claim 1, in which the link members are rigid, so that they remain constant in length irrespective of operative tilting of the frames.

11. A vehicle as claimed in claim 10, in which the link members are equal in length and the connection of each link member to the seat frame is positioned midway between the connections of that link member to the respective wheeled frames.

12. A vehicle as claimed in claim 1, in which each of the wheeled frames is in the form of a motorcycle frame, the front wheel of each frame being mounted on a fork which is pivotally displaceable about its longitudinal axis, so that a steering axis of each front wheel is provided by the longitudinal axis of the associated fork, suspension for the front wheel being incorporated in damped telescopic struts of the fork, the struts straddling the wheel so that free ends of the struts house an axle of the wheel.

13. A vehicle as claimed in claim 12, in which the rear wheel of each wheeled frame is mounted on a free end of a pivot arm which extends in the fore-and-aft direction of the vehicle and which is pivotally connected at its frontmost end to the associated wheeled frame for pivoting about an operatively more or less horizontal pivot axis, pivotal movement of the pivot arm being sprung and damped.

* * * * *